Figure 3:
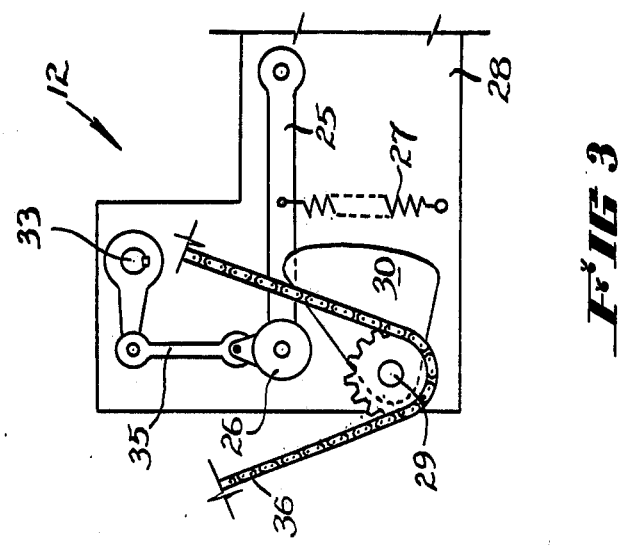

United States Patent [19]

Tomlinson

[11] 4,164,996
[45] Aug. 21, 1979

[54] TILE STACKING MACHINE AND METHOD

[75] Inventor: Robert K. Tomlinson, Woodville, Australia

[73] Assignee: Concrete Industries (Monier) Limited, Woodville, Australia

[21] Appl. No.: 822,336

[22] Filed: Aug. 5, 1977

[30] Foreign Application Priority Data

Aug. 6, 1976 [AU] Australia .............................. PC6894

[51] Int. Cl.² ............................................. B65G 47/24
[52] U.S. Cl. .................................... 198/415; 198/462; 198/411
[58] Field of Search ............... 198/411, 412, 413, 415, 198/425, 460, 462, 626; 214/7

[56] References Cited

U.S. PATENT DOCUMENTS

| 2,814,376 | 11/1957 | Hood | 198/411 |
| 3,388,815 | 6/1968 | Lingl | 198/411 |
| 3,887,066 | 6/1975 | Houtsager | 198/403 |

Primary Examiner—Robert B. Reeves
Assistant Examiner—Jeffrey V. Nase
Attorney, Agent, or Firm—Jack Posin

[57] ABSTRACT

A tile stacking machine wherein each tile is tilted while being conveyed at high speed and supported by its lower edge. The tiles are then transferred to a set of speed reducing belts to travel on edge. In most instances they are then transferred to at least one further set of speed reducing belts so as to crowd the tiles into a stack. One of the features of tilting the tiles while being conveyed edgeways, is that tilting is achieved by slowing the leading edge as it is lifted, thereby reducing tile speed even before it enters the speed reducing belts.

11 Claims, 9 Drawing Figures

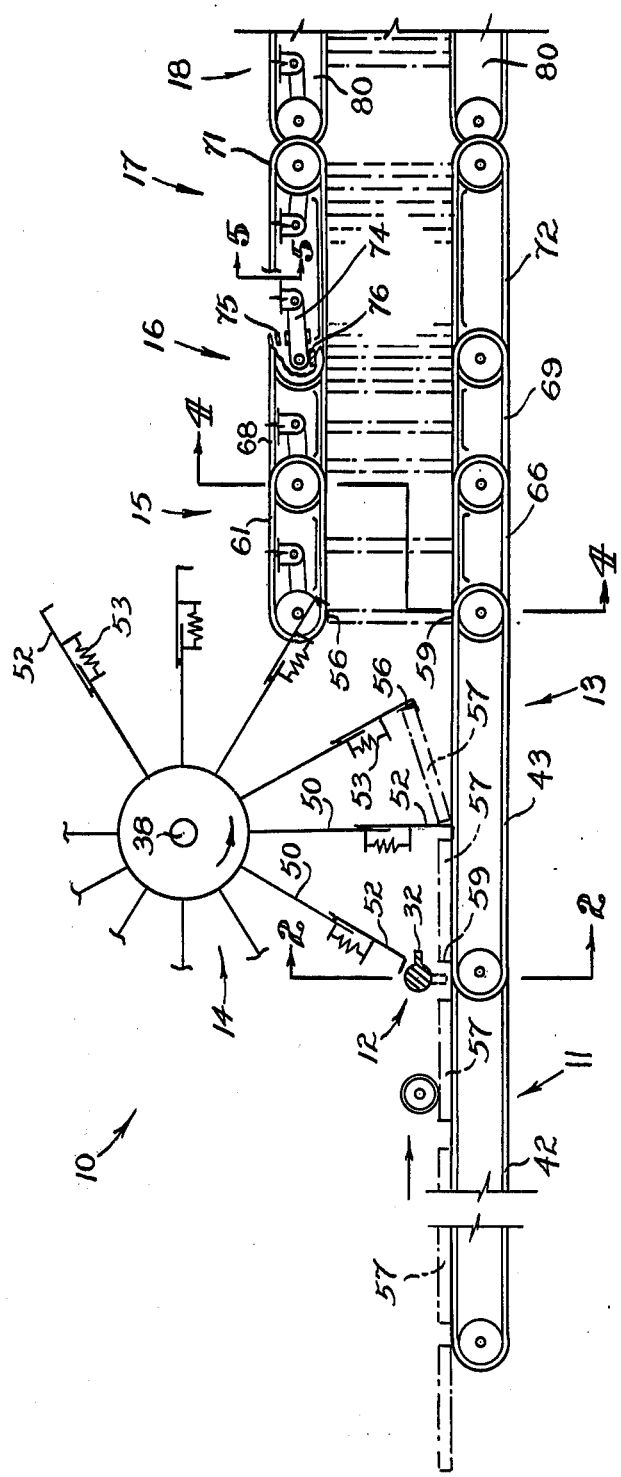

TILE STACKING MACHINE AND METHOD

This invention relates to a machine for the stacking of tiles as they emerge on a high speed conveyor from a kiln, and it also relates to a method of stacking the tiles. For the purposes of this specification, a "high speed" conveyor is a conveyor travelling at least 150 ft. (50 m) per minute, and the term "tile" is intended to include other moulded concrete and ceramic products.

BACKGROUND OF THE INVENTION

One of the major problems which is encountered in a tile producing plant is the stacking of the tiles after they have been cured. Steam curing in a kiln is a necessary step in the production of concrete tiles from a green partially set form to a much stronger and partly cured form (in which they have not yet attained their 28 day strength) so that they can be stacked and transported. In some instances the tiles are discharged from the kiln on a conveyor travelling about 240 ft. (75 m) per minute, and the stacking of the tiles presents a serious problem. The tiles have considerable weight, and travelling at that high speed have considerable inertia. They are still fragile, but it is necessary to stop or decelerate the tiles when forming a stack. However the tiles are positioned end to end on the high speed conveyor belt and travel edgeways, and deceleration is difficult to achieve. Various types of tile stackers have been proposed heretofore, and for example one form of deceleration is to arrange one tile to ride upon another and in some instances the tiles are again doubled so that the speed at which they emerge from a stacking machine is about one quarter of the speed of the input conveyor to the stacking machine, and the speed is then sufficiently slow to enable the tiles to be handled in small stacks. However this in turn results in considerable fatigue on the part of an operator, and the speed at which the tiles can be handled is limited. Even with the most elaborate machines, there is about a 10% breakage rate if the tiles are stacked face to face upon one another.

BRIEF SUMMARY OF THE INVENTION

This is a related application of application Ser. No. 822,335 filed Aug. 5, 1977, wherein tiles are stacked on edge by arresting their edgeways direction of travel and commencing travel in a direction at right angles with one tile face leading the other.

This invention is distinguished from the invention in said related application primarily in that each tile is tilted while being conveyed at high speed and supported by its lower edge. The tiles are then transferred to a set of speed reducing belts to travel on edge. In most instances they are then transferred to at least one further set of speed reducing belts so as to crowd the tiles into a stack. One of the features of tilting the tiles while being conveyed edgeways, is that tilting is achieved by slowing the leading edge as it is lifted, thereby reducing tile speed even before it enters the speed reducing belts.

More specifically, in one aspect the invention consists of a method of stacking tiles which are conveyed by a conveyor to travel edgeways, comprising:

(a) successively tilting said tiles so that each said tile is supported in turn on its then lower edge while it is being conveyed at high speed, (b) engaging said lower edge and the upper edge of each tile after it has been tilted with respective lower and upper belts of a set of speed reducing belts thereby transferring each tile in turn from said high speed conveyor, (c) driving the belts of said set of speed reducing belts at a lower speed than said high speed conveyor thereby conveying each said tile at a reduced speed in a face to face relationship, and (d) removing said stack of tiles so formed from the speed reducing belts conveying it, and transferring to a packing locality.

In another aspect, the invention consists of a tile stacking machine comprising a frame, a conveyor on the frame arranged to support each one of a plurality of tiles on a tile face and cause it to travel edgeways, bearings on the frame situated above the conveyor, a tilting head shaft journalled for rotation in the bearings, a plurality of arms radiating from the tilting head shaft, tile engaging means on each said arm having a tile engaging surface thereon, further bearings on the frame, upper and lower speed reducing belt shafts rotationally supported by the bearings, speed reducing belt pulleys on the belt shafts, a set of speed reducing belts comprising spaced belts carried by the belt pulleys, drive means coupled to said conveyor, tilting head shaft and speed reducing belt shafts arranged to drive the speed reducing belts and the tile engaging means at relatively low speed and the conveyor at relatively high speed, the locations of the tilting head shaft and speed reducing belts on the frame being such that the tile engaging means firstly lifts the front edge of a tile from the conveyor and then places it into engagement with the upper speed reducing belts at the same time as the conveyor conveys the rear edge of the tile into engagement with the lower speed reducing belts.

Figure 2:
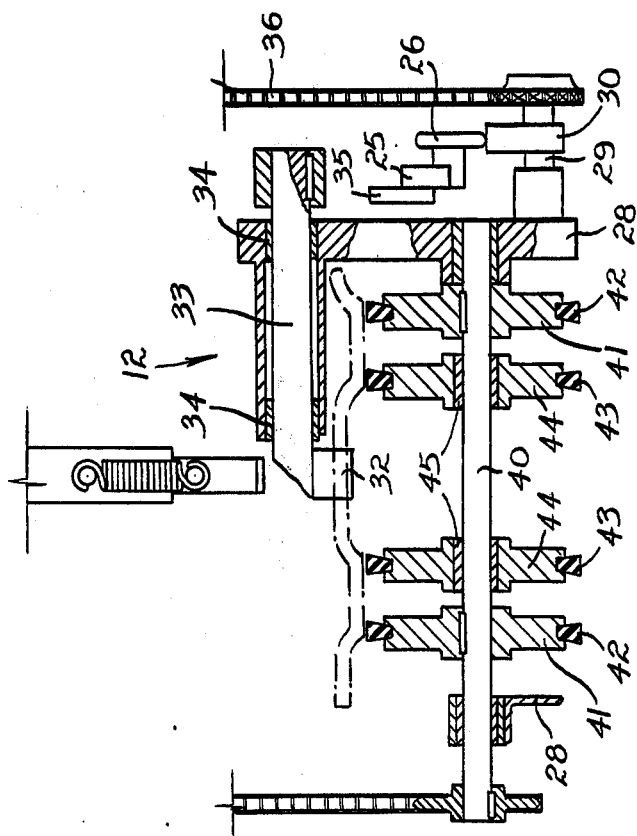
Figure 5:
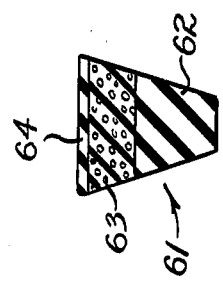
Figure 4:
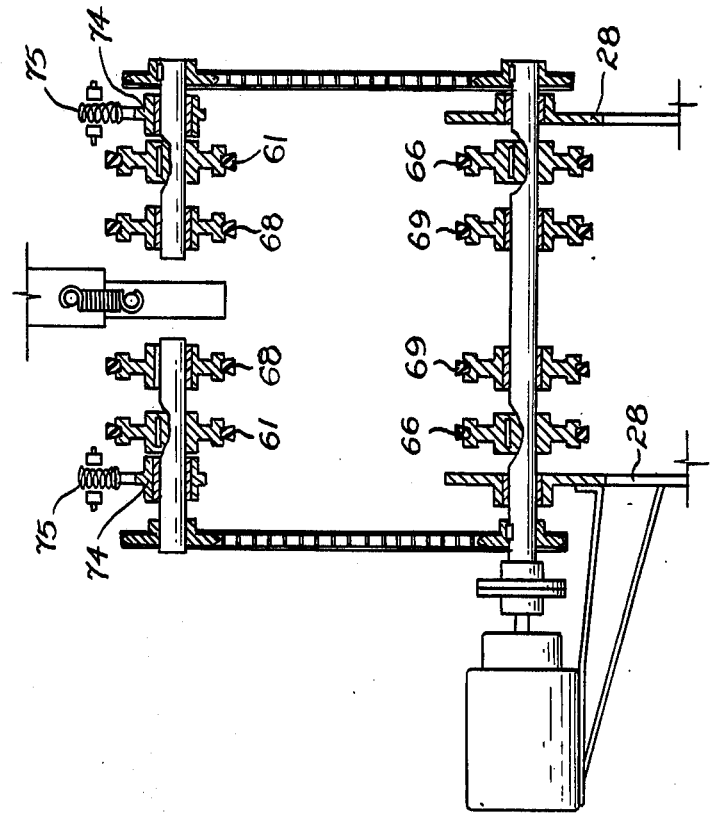
Figure 6:
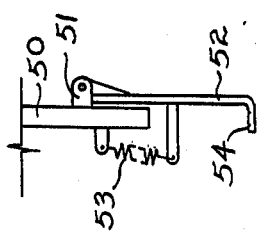
Figure 7:
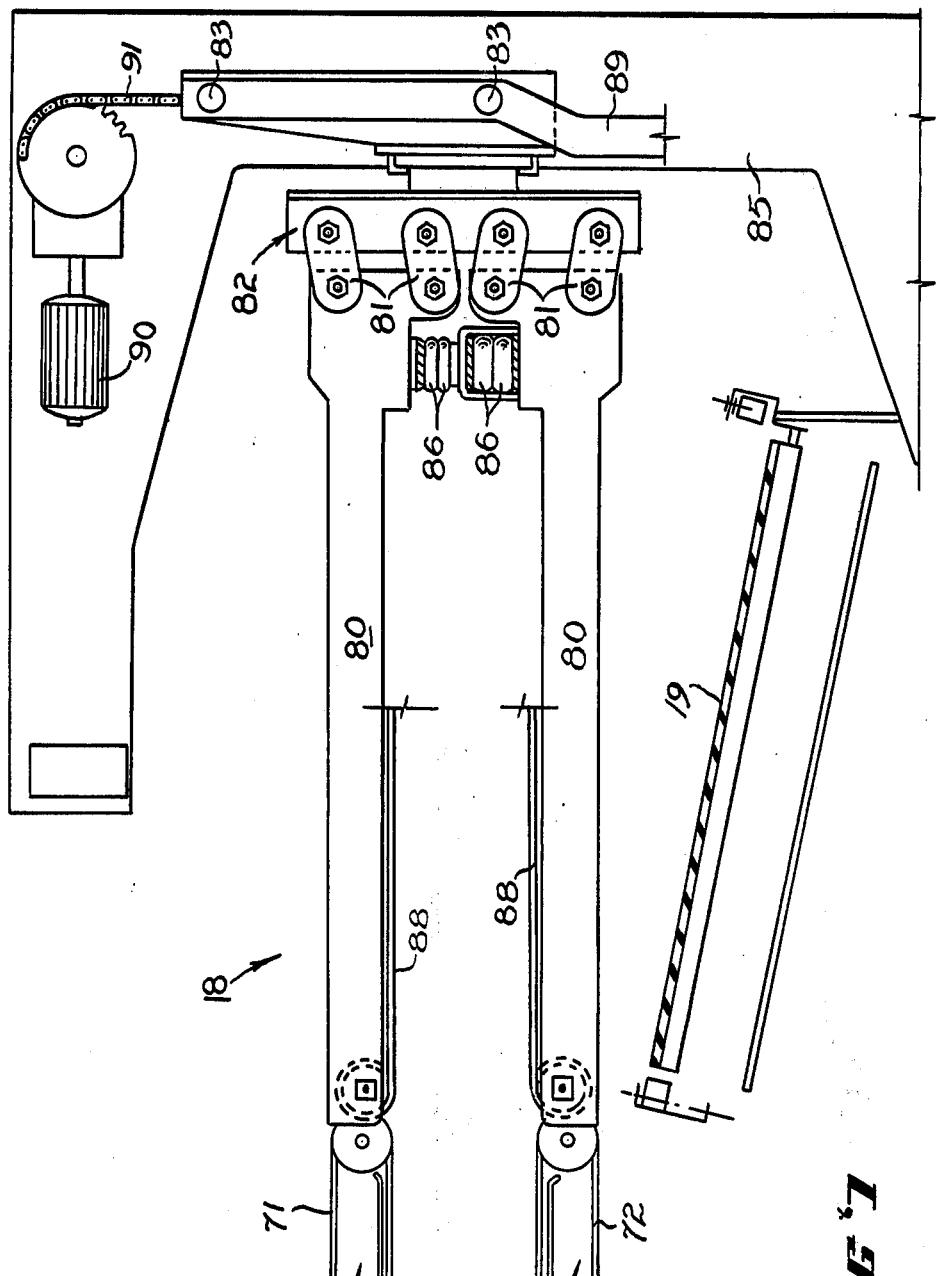
Figure 8:
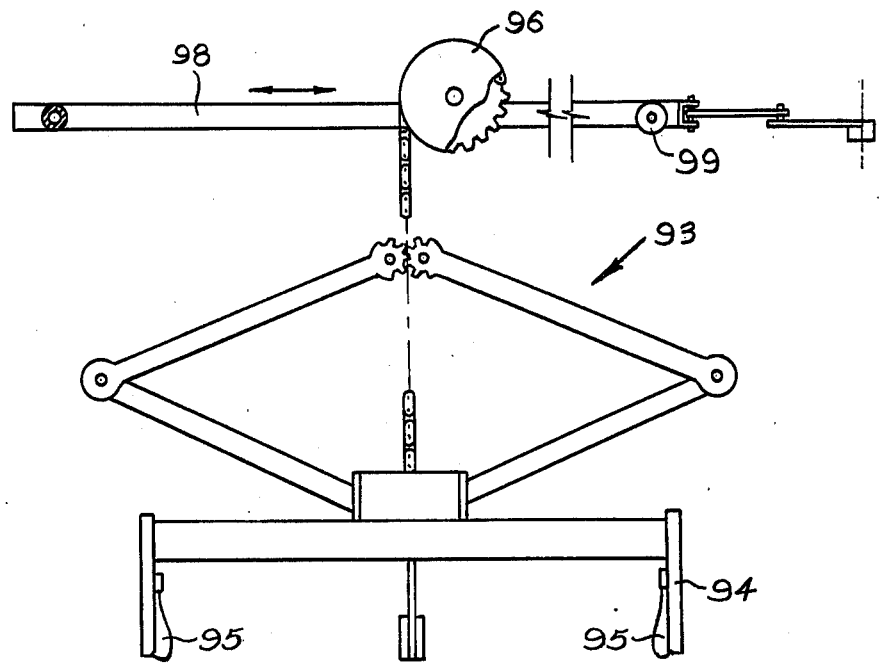
Figure 9:
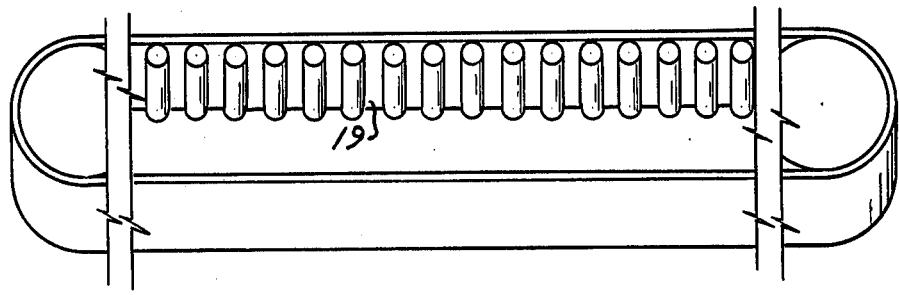

An embodiment of the invention is described hereunder in some detail with reference to and is illustrated in the accompanying drawings, in which FIG. 1 illustrates diagrammatically an elevation of a high speed conveyor, a tilting head, and three sets of speed reducing belts, FIG. 2 is a section taken on line 2—2 of FIG. 1, showing constructional details of drive means and index means, FIG. 3 is an elevation of index means associated with the high speed conveyor, FIG. 4 is a section taken on line 4—4 of FIG. 1, showing constructional details of drive means and bearings for the upper belts of the first set of speed reducing belts, FIG. 5 is a section through a speed reducing belt, drawn to an enlarged scale, and taken on line 5—5 of FIG. 1, FIG. 6 is a detail of the tile engaging means on the end of a tilting head arm, FIG. 7 is a diagrammatic elevation of a caliper belt head at the end of the speed reducing belts, which removes a stack of tiles therefrom, FIG. 8 indicates a stack lifting and transporting device and, FIG. 9 indicates a perspective of the stack conveyor.

(Details of construction of FIGS. 7 and 8 will be found also in said application Ser. No. 822335).

In this embodiment a tile stacking machine 10 is provided with, in order, an input conveyor 11, an index head 12, an accelerating conveyor 13, a tilting head 14, three sets of speed reducing belts respectively designated 15, 16, and 17, a caliper belt head 18, a transverse stack conveyor 19, and a stack lifting and transport device 93.

The input conveyor 11 is a twin belt type conveyor which is arranged to carry tiles relatively high in speed (in this example 240 ft. or 75 m per minute). The tiles are fed onto the conveyor from other conveyors associated with kilns in which the tiles have been cured, this being the normal manner in which tiles are discharged from kilns. At this speed the tiles are likely to be damaged if brought to a sudden stop from the higher speed of travel. However the tiles are arranged to firstly engage the index head 12, the index head 12 having a hinged arm 25 with a rotational roller 26 on one end, the hinged arm being a spring loaded downwardly by means of a spring 27 which extends between the arm and the machine frame 28. A sprocket shaft 29 is provided with a cam 30 which engages the roller 26, the arrangement being such that when the roller 26 is engaged by the lobe 30 the arm 25 is lifted. An index finger 32 is carried on a shaft 33 journalled in bearings 34 in frame 28, and coupled by link 35 to arm 25. A chain 36 drives the cam 30 to periodically rock the index finger 32 out of the path of tile travel and thus release a tile. The chain 36 is coupled to a shaft 38 of the tilting head 14 so that release of a tile is synchronised with rotation of the tilting head. The index finger 32 may also be provided with a decelerating pad for engagement against a tile surface.

Positioned below the indexing head 12 is a conveyor shaft 40 carrying on it two pulley sets. One pulley set designated 41 is keyed on the shaft 40 and arranged to support and drive the input conveyor belts 42 at the normal input speed (240 ft. or 75 m per minute) while the belts 43 of the accelerating conveyor 13 are carried on the other set of pulleys and are driven from their discharge ends to urge the conveyor belts 43 to move at a slightly higher speed (for example 275 ft. or 85 m per minute). The two speeds are thereby accomplished by utilising a single shaft 40 which is driven at the lower speed, but coupled to only one of the conveyors 42, the other conveyor 43 being driven from the other end and the accelerating conveyor pulleys 44 on the shaft 40 having bearings 45 between them and the shaft so that they can rotate relative to the shaft even though the shaft is itself rotating. By moving belts 43 faster than belts 42, the tiles 57 are spaced further apart, this providing time for the index finger 32 to return to the position shown in FIG. 2, where it arrests forward movement of the next tile.

Positioned vertically above the accelerating conveyor 13 is the rotationally driven tilting head 14. The tilting head 14 can occupy several forms and in this embodiment consists of a plurality (twelve) arms 50 radiating outwardly from the driven shaft 38, each arm 50 being provided at its radially outer end with a pair of pivot lugs 51 (FIG. 6), between which is pivoted a low inertia finger 52. The low inertia finger 52 is provided with a lightly loaded spring 53 which normally causes it to extend radially outwardly from the arm but the finger is free to move in a forward direction with respect to the direction of travel of the arm. The lower end of the finger 54 is curved so as to engage beneath the lower surface of the leading edge 56 of the tile 57 as it is presented to the finger. The tile is presented to the finger in synchronism with the finger movement by the chain 36.

The fingers 52 are rotating continuously about the central shaft 38 of the tilting head, and as the leading edge 56 of a tile 57 engages a finger 52, the finger is deflected slightly against the spring pressure, the tile being continually urged into contact with the finger by the belts 43 of the accelerating conveyor 13 beneath the trailing edge of the tile. Rotation of the tilting head causes the leading edge to be lifted as at the same time the trailing edge 59 continues at its previous accelerated speed. However the centre of gravity of each tile 57 is slowly decelerated as the leading edge of the tile is lifted, and a little before the tile reaches a vertical position the leading (now the upper) edge 56 of the tile moves into contact with the under surfaces of a pair of spaced belts 61 which form the upper belts of the first set 15 of three sets of speed reducing belts. Each of these belts 61 is as shown in FIG. 5, a relatively narrow rubber belt of 'V' section, designated 62, having a layer 63 of soft or sponge rubber, and a thin outer wear strip 64 of relatively tough rubber.

The trailing edge 59 of the tile 57 is simultaneously transferred from the accelerating conveyor 13 which is running at high speed to a lower pair of belts 66 immediately beneath the upper belts 61, similar in form to the upper belts and travelling at the same speed, and co-operating therewith to form the first set of speed reducing belts designated 15. By this means the tile speed is nearly halved before the tile is transferred to the first set of speed reducing belts, and the tile is then moved in an upright or nearly upright position away from the discharge end of the accelerating conveyor 13. The tile is transferred from the first set 15 of speed reducing belts to the second set 16 which travels slightly slower than the first set, again by means of upper and lower belts 68 and 69 which are carried on pulleys two of which are driven and the other two of which are freely rotatable on a sprocket shaft. The arrangement is duplicated top and bottom so that the top and bottom edges of the tile are firmly gripped. Still further deceleration takes place in a third set 17 of speed reducing belts (upper belts 71, lower belts 72), and the effect of the three decelerating conveyors is to "crowd" the tiles into face to back contact. The tiles are separated into stacks spaced from one another by periodically stopping conveyors 11 and 13, and others.

In order to accommoate variations in tile length and also to reduce shock, the upper belts 61, 68 and 71 of the speed reducing belt sets 15, 16 and 17, are themselves carried on pulleys which are either fixed to or rotatable on shafts, the shafts being supported in bearings on the ends of the swinging arms 74. Spring 75 extend between the swinging arms and the frame 28 urging the ends downwardly. Downward movement is limited by means of an adjustable stop 76 carried on the frame 28. Under normal circumstances resilience of the belts is sufficient to accommodate variations encountered in the tiles, but under extreme circumstances the springs 75 are capable of compressing thereby protecting the equipment against damage by means of malformed or badly positioned tiles.

FIGS. 7 and 8 illustrate the stack removal means, which are the same as in said related application Ser. No. 822335.

A pair of calipers 80 are carried on parallel arms 81 extending from a rotary head 82 supported by rollers 83 engaging a track 89 on a frame 85. Air bags 86 control the distance apart of calipers 80. The calipers 80 also carry on them conveyor belts 88, and these accept a stack of tiles from the third speed reducing belt set 17. A motor 90 then lowers the caliper belt head through chain 91, the rotating head 82 is caused to rotate 90°

(alternately in opposite directions), and the stack is placed upon the transverse stack conveyor 19.

The stack is subsequently removed from conveyor 19 by the stack lifting and transporting device 93 (FIG. 8), which raises or lowers an air bag clamp 94 having air bags 95 thereon, by means of motor 96. The device 93 is suspended from a trolley 98 carried on wheels 99 which engage a track (not shown).

In the method of the invention, the tiles are fed at relatively high speed (240 ft. per minute) on an input conveyor, and they are indexed by the index finger 32 so as to synchronise with the low inertia fingers 52 on the tilting head arms 50. However the indexing device is positioned above two sets of pulleys, the second set being slightly higher in speed than the input conveyor so that upon release of a tile by the lifting of the indexing finger 32, the tile speed is increased thereby creating a space between that tile and the next. The leading edge 56 of the tile 57 as engaged by a low inertia finger 32 on an arm 50 of the tilting head and the leading edge is raised unitl the leading edge is placed into contact with the upper belts 61 of the first set of speed reducing belts designated 15. Meanwhile the frictional engagement between the surface of the accelerating conveyor belts 43 and the trailing edge 59 of the tile 57 urges the trailing edge into engagement with the lower belts 66 of the first set 15 of belts. The tile is then moving in a sloping or vertical position, and is driven to the second set of speed reducing belts and then to the third, its speed continuously dropping. The number of sets of speed reducing belts will depend on the speed of the accelerating conveyor. Finally the tile lies face to back with the tile previously positioned, and the stack is transferred to the caliper belt head 18.

The drive required for effecting operating of the conveyors and of the tilting head is by means of motors coupled to respective shafts in known manner. Speed control means is provided so that perfect stacking spacing can be achieved.

A brief consideration of the above embodiment will indicate that the invention is relatively simple. Merely by tilting the tile from its horizonal to its vertical position its speed is almost halved, and still further deceleration is then readily achievable by means of the decelerating conveyors. The invention can of course have different aspects, and for example the fingers can lower instead of raising the leading edges of the tiles. The tiles can be delivered to smooth surface belts, belts having spacing teeth thereof, belts having resilient bristles thereon, or belts having stiff bristles thereon. Alternatively, some of the conveyors at least may be chain conveyors wherein each tile is separately supported by one or a plurality of chain links.

Various modifications in structure and/or function may be made by one skilled in the art to the disclosed embodiments without departing from the scope of the invention as defined by the claims.

I claim:

1. A method of stacking tiles which are conveyed by a conveyor to travel edgeways, comprising:
   (a) engaging the leading edge of each successive tile by a finger of a rotating tilting head and lifting upwardly so that each said tile is supported in turn on its then lower edge while the lower edge is being conveyed at high speed on a high speed conveyor,
   (b) engaging said lower edge of each tile after it has been tilted with a lower belt and releasing the tilting head finger from the tile upper edge while simultaneously transferring the upper edge into engagement with an upper belt of a set of speed reducing belts thereby transferring each tile in turn from said high speed conveyor,
   (c) driving the belts of said set of speed reducing belts at a lower speed than said high speed conveyor thereby conveying each said tile at a reduced speed in a face to back relationship, and
   (d) removing said stack of tiles so formed from the speed reducing belts conveying it, and transferring to a packing locality.

2. A method according to claim 1 wherein said removing of said stack of tiles comprises positioning said stack of tiles between a pair of calipers of a caliper head, lowering the head and at the same time rotating the head, and releasing the stack of tiles from the head.

3. A method according to claim 1 further comprising indexing each tile in turn, to synchronise with the tilting head finger.

4. A method according to claim 1 further comprising indexing each tile in turn and conveying the tiles after indexing and before tilting at a speed exceeding the speed at which they are conveyed before indexing.

5. A method according to claim 1 further comprising transferring each tile in turn from said set of speed reducing belts to one or more further sets of speed reducing belts to progressively decelerate the rate of tile travel.

6. A tile stacking machine comprising:
   a frame,
   a driven conveyor means on the frame for supporting each one of a plurality of tiles on a tile face and causing the tile to travel edgeways, the conveyor means being driven at a given speed,
   a rotating tilting head being driven at a speed less than the given speed,
   a plurality of arms radiating from a shaft of the tilting head,
   tile engaging means on each of said arms having a tile engaging surface thereon, and
   a spaced parallel first set of speed reducing belts comprising upper and lower belts driven at a speed less than the given speed, whereby
   the locations of the tilting head and the speed reducing belts being such that the tile engaging means lifts a front edge of a tile from the conveyor means and places the front edge into engagement with the upper speed reducing belt at the same time as the conveyor means conveys a rear edge of the tile into engagement with the lower speed reducing belt.

7. A tile stacking machine according to claim 6 comprising one or more further sets of spaced speed reducing belts having upper and lower belts for engaging front and rear tile edges, respectively, each of the further sets of belts being driven at a lower speed than the first set.

8. A tile stacking machine according to claim 7 wherein the further sets of belts are arranged in series, each succeeding further set being driven at a lower speed than preceding set.

9. A tile stacking machine according to claim 6 further comprising an index head having an index finger movable between a position where it arrests tile travel and a retracted position, and drive means between the index finger and the tilting head shaft.

10. A tile stacking machine according to claim 9 wherein said conveyor means includes an accelerating conveyor means between said index head and said tilting head for spacing the tiles on the conveyor means and an input conveyor means, said accelerating conveyor means being driven at a speed exceeding the speed of the input conveyor means.

11. A tile stacking machine according to claim 6 wherein said tile engaging means of each said tilting head arm comprises a finger pivoted to its radially outer end, and a spring extending between that said arm and its finger, said tile engaging surface being a surface of the finger.

* * * * *